3,431,897
ENGINE TIMING ARRANGEMENT
Lamont Eltinge, Birmingham, Mich., assignor to Ethyl Corporation, New York, N.Y., a corporation of Virginia
Filed Jan. 24, 1967, Ser. No. 611,345
U.S. Cl. 123—117      3 Claims
Int. Cl. F02p 5/10

ABSTRACT OF THE DISCLOSURE

Engine ignition timing is temporarily sharply retarded whenever engine load is increased, by differential pressure control having one of the differential pressures connected to engine vacuum and to a servo that magnifies pressure increases.

---

The present invention relates to the timing of spark-ignition engines such as used in automobiles.

Among the objects of the present invention is the provision of a novel timing arrangement that improves the operation of the engine by reducing the discharge of undesired emission from the exhaust.

The foregoing as well as additional objects of the present invention will be more fully understood from the following description of several of its exemplifications, reference being made to the accompanying drawings wherein.

According to the present invention an ignition timing mechanism for a spark ignition engine has a differential fluid pressure control with two fluid pressure chambers connected to operate a timing adjuster when the pressure in one of the chambers is higher than in the other, said timing adjuster being connected to cause the ignition timing to be sharply retarded when the adjuster is operated, a pressure servo connected to rapidly magnify the effect of any pressure increase therein, a balancing bleed connected between the two chambers to slowly equalize the pressure in them, and acceleration-responsive means connected to cause the pressure in said one chamber to increase when the engine is undergoing an increase in load.

The servo can be connected to complete a magnifying operation within a few seconds after it is initiated, inasmuch as about 10 to 30 seconds of ignition retard is ample for the purposes of the present invention.

Figure 1:
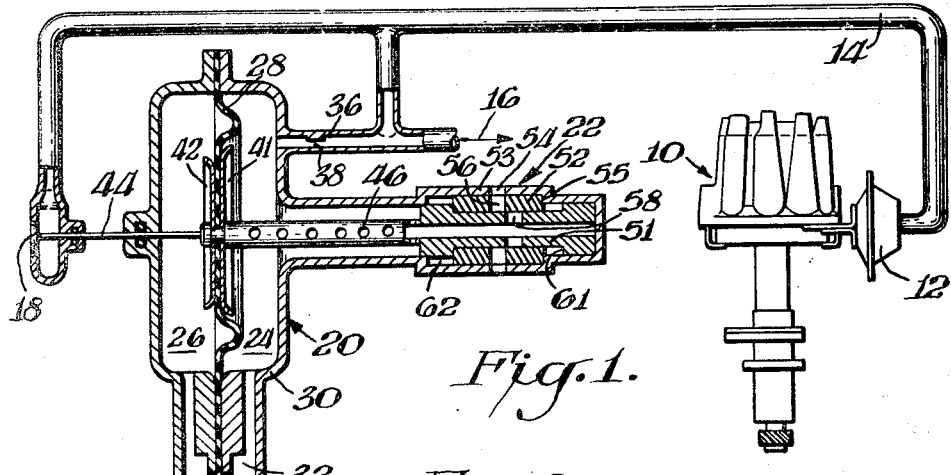
FIG. 1 is a somewhat schematic view, partly in section, of one form of timing control mechanism embodying the present invention, the mechanism being shown in one operative condition.

The construction of FIG. 1 includes a distributor 10 which may be of conventional type having a centrifugal spark advance of standard arrangement (not shown), and a vacuum advance having a rotatable timing plate operated by a suction head 12 connected by line 14 to a source of suction indicated by the arrow 16. Source 16 can be the intake manifold of the engine, or the carburetor throat downstream of the throttle. The vacuum advance is arranged to advance the spark timing above and beyond the centrifugal advance a substantial amount, generally at least about 15°, when the engine is cruising at part throttle. Such advance brings the engine operation to a condition of high fuel economy.

In the illustrated construction line 14 is connected to a vent valve 18 operated by a differential pressure control 20 that includes a servo 22 for magnifying pressure changes. Control 20 has a differential pressure assembly including a first chamber 24 and a second chamber 26 on opposite sides of a diaphragm 28 clamped in a housing 30. An equalizing passageway 32 establishes communication between the chambers, and is provided with a restriction 34 that limits the transfer of air from one chamber to the other. Chamber 24 is also connected to vacuum line 14 by way of a branch 36 that also has a restriction 38. Restriction 38 permits more rapid air flow than restriction 34 so that changes in pressure within vacuum line 14 are rapidly communicated to chamber 24 but only slowly to chamber 26.

Diaphragm 28 is held between the cups 41, 42 which are in turn connected by stem 44 to valve 18. In addition, the diaphragm and cup combination is also connected by means of perforated tube 46 to the servo mechanism which includes an internal spool 51 and a ring 52 that surrounds the spool, both fitted for slidable reciprocation in a cylinder 53. The cylinder has an opening 54 through which air can be admitted, and the ring and spool have openings 56 and 58 which can be brought into alignment with opening 54 to thus admit air from the outside atmosphere into the interior of the spool. The set of openings 54, 56 and 58 can be repeated at various locations of the servo in order to increase the rate at which air is admitted.

Spool 51 is shown as coupled to perforated tube 46 while ring 52 is permitted to float, although it can be relatively closely fitted against the inside of cylinder 53 so that there is substantial friction between them, tending to keep the ring in any position it happens to find itself. However, the ring is arranged to be moved by flanges 61, 62 which constitute the longitudinal ends of the spool 51.

FIG. 1 illustrates the timing mechanism of the present invention in the condition it assumes when the engine to which it is connected has been running with a constant manifold vacuum. By reason of this constancy the pressure in chambers 24, 26 is the same so that the diaphragm holds valve 18 closed and also holds spool 51 in its extreme right-hand position. In this position the spool's flange 62 holds ring 52 so that openings 54, 56 are aligned. A shoulder 55 can be provided at the end of cylinder 22 to assure that the ring is retained in this position. As shown, opening 58 is in this position just sufficiently offset from opening 56 to prevent air flow therebetween.

Figure 2:
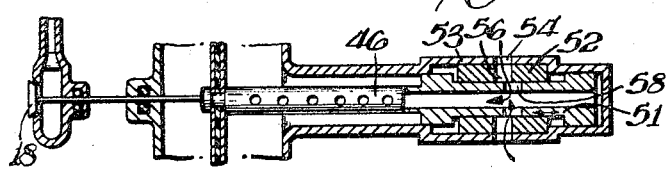
FIGS. 2, 3, 4 and 5 are detail views similar to FIG. 1 showing successive steps of the mechanism as it goes through an operating cycle.

Should the load on the engine now increase, as for example by opening its throttle even a little bit in order to accelerate, the pressure in vacuum line 14 will promptly increase at least a small amount. This increase will then develop in chamber 24 before its effect begins to be felt in chamber 26. Diaphragm 28 is thus moved to the left by the differential pressure in the chambers. Even a small degree of such motion will cause spool opening 58 to become at least partially aligned with openings 56 and 54, as shown in FIG. 2. Some air is then admitted to the interior of perforated tube 46 and from there into chamber 24, causing the diaphragm to be moved even farther to the left.

Figure 3:
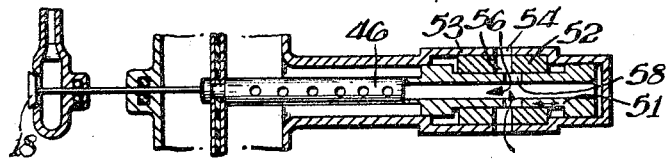
Figure 4:
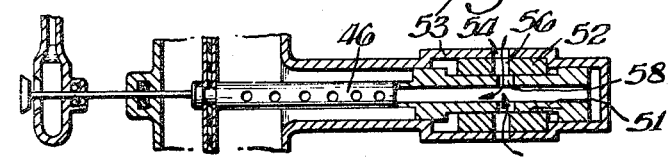

As shown in FIG. 3, still more air is thus admitted through the servo, eventually bringing the diaphragm over as far as it will go to the left and carrying the spool and ring into the position shown in FIG. 4. In the meantime valve 18 has been opened causing air to rapidly rush into vacuum line 14 to thereby disable the entire, or substantially the entire vacuum advance.

Figure 5:
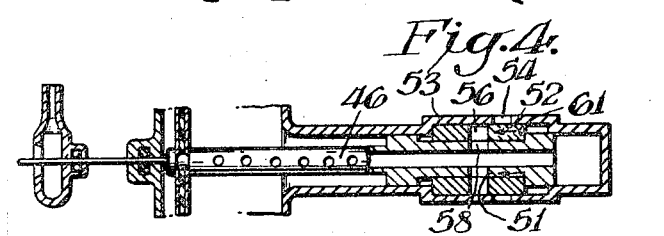

Also during this diaphragm movement, air travels from chamber 24 through restriction 34 into chamber 26 gradually equalizing the pressure in these chambers and returning the diaphragm from its extreme left-hand position. In the first part of the return movement, as illustrated in FIG. 5, the spool 51 is moved to the right, leaving ring 52 unmoved until it is engaged by flange 62. At the time of such engagement openings 58 and 56 are again offset just enough to prevent air flow therebetween, and this condition is maintained for the balance of the return movement of the spool. During the return movement there is accordingly no more air admitted to chamber 24 so that the operating cycle of the control is completed and it returns to the condition indicated in FIG. 1. Upon such return valve 18 is also closed and operating suction from the engine's manifold or the like is reestablished in suction line 14. This suction is first transmitted to chamber 24 before it is felt in chamber 26 so that diaphragm 28 applies a definite force to make sure that valve 18 is kept closed and the servo mechanism kept in the FIGURE 1 position. After a few more seconds the vacuum will be equalized throughout the timing mechanism and it is ready to respond to the next throttle-opening movement.

The servo 22 can be equipped with a return spring to help assure the return of spool 51 to its extreme right-hand position without relying on the resilience of the diaphragm 18. Such a return spring can be a compression spring conveniently fitted between the diaphragm and the left-hand wall of chamber 26, as seen in FIG. 1.

The air inlets 54 are preferably fitted with dust filters to keep from having the servo fouled by particles of solid that may hinder or prevent sliding of the spool and/or ring. A filter may similarly be provided for the air intake into valve 18. Either or both of these filter arrangements can be in such form as to use the air filter that conventionally covers the carburetor air intake of the engine. Air inlets 54 and 18 can thus be located on the downstream side of the carburetor air filter.

A 15 degree loss of advance during the time valve 18 is open materially reduces the emission of nitrogen oxides and hydrocarbons from the exhaust, yet does not otherwise significantly affect its performance. There is a drop in fuel economy during the periods of ignition retarding, but such retarding forms a relatively small fraction of the engine's overall operation and the drop is insignificant.

The minimum duration of the loss of vacuum advance can be timed by suitable selection of restriction 34 and it is desirably at least about 2 seconds long. Even this short loss of vacuum advance has a pronounced effect in reducing the hydrocarbons and nitrogen oxides emitted from the engine's exhaust during such acceleration, and is very significant in combatting smog-inducing operations. Only about 10 to 30 seconds of such vacuum loss is all that is needed even if the acceleration is prolonged beyond that time. The more drastic accelerations, as for example at full throttle, generally cause an increase in pressure in vacuum line 14 and head 12 sufficient without the invention to retard the timing about 5° or so, and the need for the present invention is not so material during such operation, although it is helpful.

Figure 6:
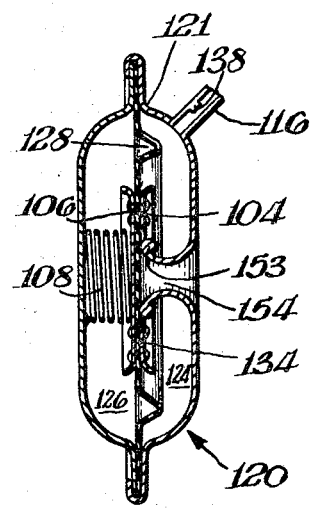
FIG. 6 is a vertical sectional view of another embodiment of a control assembly representative of the present invention for effecting the desired timing control.

FIG. 6 shows a somewhat simpler form of control 120 that can be used in the general combination of FIG. 1. Control 120 has a housing 121 in two shell-like halves spun together to form two chambers 124, 126 separated by diaphragm 128, chamber 124 being connected by conduit 116 to the vacuum advance head. A turned-in portion 153 of the housing wall provides an air inlet 154 that is covered by the diaphragm and held in sealing engagement against it by a spring 108. A restricted equalizing passageway 134 is provided in the diaphragm, as by riveting together on opposite faces of the central portion of the diaphragm a disc 106 and a ring 104, both of which are provided with accurately sized aligned apertures that overlie a somewhat larger perforation in the diaphragm. The cut-out center of ring 104 exposes the diaphragm which preferably has a soft surface so that it establishes a very effective seal against the mouth 153 of the air inlet.

Conduit 116 can also have a restriction 138 substantially less restrictive than passageway 134 to essentially limit the flow of air from inlet 154 into the engine's induction system, but this feature is not needed if such flow of air does not deleteriously affect the engine's induction.

In operation the embodiment of FIG. 6 keeps air intake 154 closed so long as the pressures in the induction system, and therefore in conduit 116 and chambers 124, 126, are constant. Accordingly, when the engine is not running or is cruising at constant load, the intake 154 is closed and the ignition timing is normal. This condition is also maintained when the pressure in the engine's induction system is dropping, as during decelerations. Such a drop in pressure causes the diaphragm 128 to be more tightly pressed against the air intake mouth 153.

With the engine running and its throttle undergoing an opening movement, the pressure in conduit 116 increases and this promptly pushes diaphragm 128 away from air intake mouth 153. As a result air rushes through the mouth into chamber 124 which is at subatmospheric pressure, further increasing the pressure in this chamber and further uncovering the air inlet mouth 153. The diaphragm is accordingly moved as far as it can go to the left upon a pressure change in conduit 116 sufficient to overcome spring 108. The spring can be so selected that small accelerations such as those of less than about 1 mile per hour per second are accompanied by pressure changes that equalize through passageway 134 without triggering the servo action. The same limiting action can be provided in the construction of FIG. 1 or if the spring is not used, by appropriate selection of the equalizing passageway in relation to the volume of chamber 24 and to any restriction in line 36.

The diaphragm is moved to the left pursuant to acceleration of sufficient magnitude. After a time that depends upon the size of passageway 134, the pressures in chambers 124, 126 will be about equalized by air movement through that passageway, and the spring 108 will return the diaphragm to its right-hand position where it again closes air intake mouth 153, permitting the suction in conduit 16 to bring both chambers back to their usual subatmospheric pressure. During the period when the pressure in chamber 124 is high the vacuum advance is sharply reduced or entirely ineffective.

Instead of having the differential control and servo operated pneumatically, as described in the above constructions, they can operate hydraulically, particularly if the diaphragm is to be of relatively small size to fit in cramped quarters.

Some increases in engine loading are not accompanied by increases in engine speed. For example, an automobile being driven on a level road at constant speed has its engine subjected to an increase in load when the road changes to upgrade. If the engine's throttle is not changed in position its speed will fall off some. However, its manifold pressure may undergo a slight temporary rise because of such speed reduction.

The ignition retard of the present invention reduces the undesirable exhaust emission during the foregoing change from level to upgrade operation. However, the ignition retard further reduces the engine's power, and this effect can be counteracted as by having an inertia-operated valve connected to shut off tap 36 or open a large by-pass between chambers 24 and 26 whenever an automobile powered by the engine having the foregoing timing mechanism is not undergoing an increase in forward speed.

During rapid deceleration of some automobiles having a throttle-closing check that slows the rate of throttle closure, there may also be a temporary increase in manifold pressure. The timing mechanism of the present invention, as illustrated in FIG. 1, will also cause ignition retard as a result of that pressure increase. This retard is quite desirable inasmuch as it improves the braking effect of the engine. It can accordingly be combined with the smog-combatting arrangement described in connection with FIGS. 1 and 2 of U.S. Patent 3,282,261 granted Nov. 1, 1966, where it can produce prompt loss of all vacuum advance before the throttle closes far enough to do its own shutting down of the vacuum advance. When this combination is used with the foregoing inertia-operated valve that disables the servo effect, that valve can in turn be disabled by the throttle-closing check.

The ignition retard of the present invention can be made of larger amplitude than that of the vacuum advance. The rod 44 can, for instance, be connected directly to the vacuum advance mechanism 12 to overpower the vacuum advance and push the timing plate in the retard direction beyond the zero advance position. Valve 18 and its associated conduit can then be eliminated from the construction.

Instead of increasing the pressure in the chamber 24 (or 124), the servo of the present invention can be connected to further decrease the pressure in the opposing chamber, or to connect an additional fluid pressure head to apply a left-hand push to the stem 44. A separate suction head similar to head 12 can, for example, be arranged so that a very small left-hand movement of stem 44 causes a servo like 22 to apply suction to the separate head and thus causes it to exert a left-hand pull on the stem to move it sharply to its left-hand limit. At that limit the servo disconnects the separate suction supply and permits the principal opposing chambers to return to equilibrium.

Obviously many other modifications and variations of the present invention are possible in the light of the above teachings. It is, therefore, to be understood that within the scope of the appended claims the invention may be practiced otherwise than as specifically described.

What is claimed is:
1. An ignition timing mechanism for a spark ignition engine, said mechanism including a different fluid pressure control having two fluid pressure chambers connected to operate a timing adjuster when the pressure in one of the chambers is higher than in the other, said timing adjuster being connected to cause the ignition timing mechanism to be sharply retarded when the adjuster is operated, a pressure servo connected to said one of the chambers to rapidly magnify the effect of any pressure increase therein, a balancing bleed connected between the two chambers to slowly equalize the pressures in them, and acceleration-responsive means connected to cause the pressure in said one chamber to increase when the engine is undergoing an increase in load.

2. The combination of claim 1 in which the servo is connected to complete a magnifying operation within a few seconds after it is initiated.

3. The combination of claim 1 in which the servo is connected to open to the atmosphere the chamber in which the pressure increases.

References Cited

UNITED STATES PATENTS 2,650,581    9/1953    Short _____ 123—117

WENDELL E. BURNS, *Primary Examiner.*

U.S. Cl. X.R.

123—97